United States Patent
Lotsch

[11] 4,356,123
[45] Oct. 26, 1982

[54] SPARINGLY SOLUBLE ISOINODOLINE COLORANTS

[75] Inventor: Wolfgang Lotsch, Beindersheim, Fed. Rep. of Germany

[73] Assignee: BASF Aktiengesellschaft, Ludwigshafen, Fed. Rep. of Germany

[21] Appl. No.: 128,153

[22] Filed: Mar. 7, 1980

[30] Foreign Application Priority Data

Mar. 12, 1979 [DE] Fed. Rep. of Germany ....... 2909645

[51] Int. Cl.$^3$ ............... C07D 403/12; C09B 57/04; C07D 209/44; C08K 5/34
[52] U.S. Cl. ........................ 548/460; 260/165; 106/22; 106/23; 524/542; 524/94
[58] Field of Search ........... 260/326 C, 326 N, 326.1, 260/326 S

[56] References Cited

U.S. PATENT DOCUMENTS 3,646,033  2/1972  Leister et al. ............... 260/326.1
4,051,099  9/1977  von der Crone ............ 260/326.1

*Primary Examiner*—Mark L. Berch
*Attorney, Agent, or Firm*—Oblon, Fisher, Spivak, McClelland & Maier

[57] ABSTRACT

Sparingly soluble isoindoline colorants of the formula

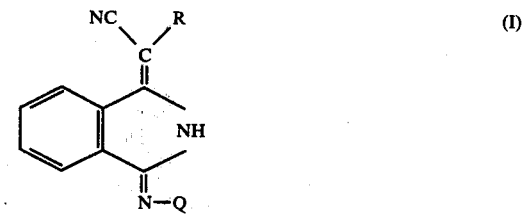

where R is carbamyl, N-$C_1$-$C_4$-alkylcarbamyl or N-phenylcarbamyl and Q is a group of the formula

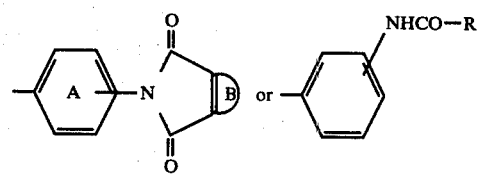

where A is 1,3- or 1,4-phenylene and the ring B is 1,2-phenylene, 1,2-naphthylene or 2,3-naphthylene and R has the above meanings, and where the phenyl radicals in R, A and B independently of one another may be unsubstituted or substituted by groups which do not confer solubility.

The colorants I may be used as pigments and for coloring finishes, printing inks and plastics.

9 Claims, 1 Drawing Figure

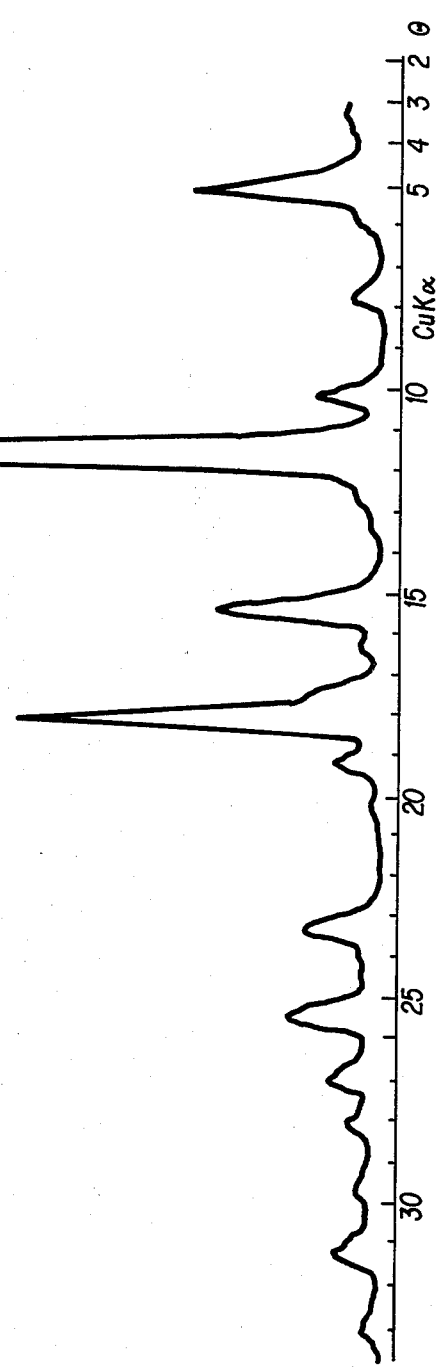

SPARINGLY SOLUBLE ISOINODOLINE COLORANTS

The present invention relates to novel sparingly soluble isoindoline colorants of the general formula

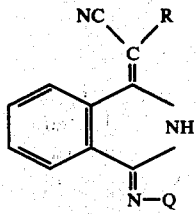

where
R is carbamyl, N-C-C$_4$-alkylcarbamyl or N-phenylcarbamyl and
Q is a group of the formula

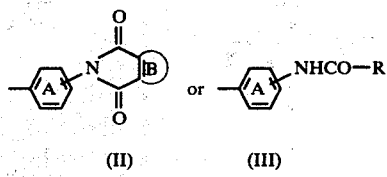

where A is 1,3- or 1,4-phenylene and the ring B is 1,2-phenylene, 1,2-naphthylene or 2,3-naphthylene and R has the above meanings, and where the phenyl radicals in R, A and B may be unsubstituted or carry substituents which do not confer solubility.

The colorants of the formula I are pigments and may be used for pigmenting finishes, printing inks and plastics. In these media, they give colorations in pure yellow hues, which in addition to having good fastness to migration exhibit excellent lightfastness.

For the purposes of the invention, substituents which do not confer solubility are substituents which do not result in solubility of the colorant in either water or organic solvents, for example halogen, alkyl or alkoxyof 1 to 6 carbon atoms, nitro, trifluoromethyl, carbamyl, ureido, sulfamyl or cyano, alkoxycarbonyl, alkanoyl, alkylcarbamyl, alkylureido and alkanoylamino, in each case with alkyl of 1 to 5 carbon atoms, alklsulfonyl and alkylsulfamyl, each of 1 to 6 carbon atoms, aryloxycarbonyl, aroyl, aroylamino, arylsulfonyl, arylcarbamyl, arylsulfamyl, aryl, arylureido and arylazo.

Preferred substituents which ensure insolubility are chlorine, bromine, C$_1$-C$_4$-alkyl and/or C$_1$-C$_4$-alkoxy.

Specific examples of substituents R are carbamyl, N-methyl, N-ethyl-, N-propyl-, N-isopropyl-, N-butyl- and N-isobutyl-carbamyl and N-phenylcarbamyl, where phenyl is unsubstituted or substituted by chlorine, bromine, C$_1$-C$_4$-alkyl, eg. butyl, propyl, ethyl or methyl, or C$_1$-C$_4$-alkoxy, eg. butoxy, propoxy, ethoxy or methoxy. Preferably, R is carbamyl or N-phenylcarbamyl, and in the latter the phenyl is unsubstituted or substituted by chlorine, bromine, methyl or methoxy.

Amongst the compounds of the formula I, preferred colorants are those of the formula IV:

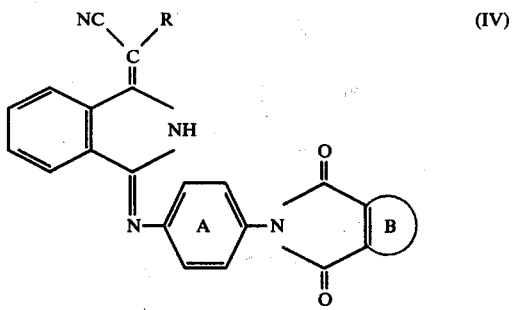

where R, A and B have the above meanings.

Particularly preferred colorants of the formula I are those where Q is

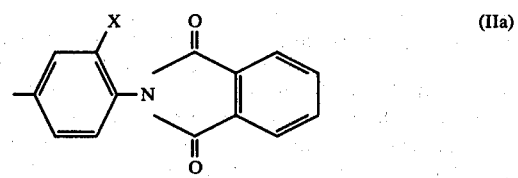

X being hydrogen, chlorine, methyl and methoxy. Amongst these colorants, those where R is carbamyl or N-phenylcarbamyl are, in turn, preferred.

A very particularly preferred compound is that of the formula V

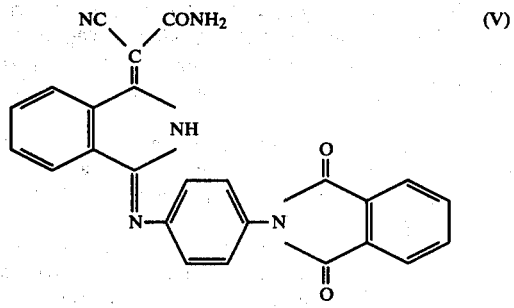

in a pigmentary form which is characterized by the X-ray diagram shown in FIG. 1.

The colorants according to the invention are obtained by condensing diiminoisoindoline in a conventional manner with one mole of a compound $$NC-CH_2-R \qquad (VI)$$

and then condensing the product (ie. the semi-condensation product) of the formula

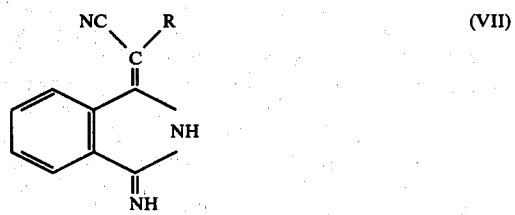

with one mole of a compound

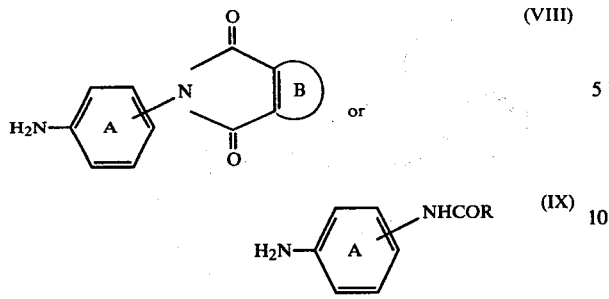

where A, B and R have the above meanings.

The condensation of the diiminoisoindoline with the cyanomethylene-active compound of the formula VI is preferably carried out in water or in an organic solvent or diluent, for example an aliphatic alcohol of 1 to 4 carbon atoms, eg. methanol, ethanol, isopropanol or butanol, a glycol or glycol-ether, an open-chain or cyclic amide, eg. dimethylformamide, dimethylacetamide or N-methylpyrrolidone, or a mixture of the above solvents. A slight excess of diiminoisoindoline may be advantageous. The amount of solvent or diluent is not critical per se and is determined by the fact that the reaction batch must be stirrable and miscible. The reaction is as a rule carried out at below 100° C.

The condensation of the semi-condensation product of the formula VIII with the aniline derivative of the formula VIII or IX is carried out in one of the above solvents, or perferably, in an aliphatic monocarboxylic acid, eg. acetic acid or propionic acid, at from 50° to 150° C.

Both the semi-condensation products of the formula VII, and the pigments of the formula I precipitate from the hot mixture and can be isolated in the pure form by filtering off and, if necessary, washing with an organic solvent.

By suitably carrying out the reaction, it is also possible to effect both reaction steps in the same reaction vessel without intermediate isolation of the semi-condensation product of the formula VII.

The crude products obtained can in general be used as pigments. They can however also be converted by conventional conditioning processes into the optimum pigmentary form for any particular use. In some cases, for example in the case of the crude product of the formula V, it is possible to obtain particularly valuable pigmentary forms by such conditioning.

The Examples which follow, and in which parts and percentages are by weight, illustrate the invention.

EXAMPLE 1

21 parts of 1-(cyano-carboxamidomethylene)-3-iminoisoindoline and 24 parts of 4-phthalimidoaniline in 500 parts of glacial acetic acid are boiled for 4 hours. After the mixture has cooled, it is filtered and the product is washed with glacial acetic acid and methanol, and dried. 41 parts of the pigment of the formula V re obtained; this material can be used directly, in the form obtained, as a pigment in paints and plastics. The colorations obtained therewith exhibit a pure greenish yellow hue, and have good fastness to migration and light.

A particularly advantageous pigmentary form of the pigment of the formula V is obtained if, for example, 10 parts thereof, in 200 parts of dimethylformamide, are stirred for 4 hours at 100° C. After cooling, filtering off and washing with dimethylformamide and methanol, 9.3 parts of a pigmentary form of the compound of the formula V are obtained; this form is characterized by the X-ray diffraction diagram shown in FIG. 1 (see also Table III).

Finishes colored with this novel pigmentary form exhibit a pure greenish yellow hue and have good fastness to overspraying and excellent fastness to weathering.

EXAMPLES 2 TO 15

The procedure described in Example 1 is followed, except that the aniline derivatives of the formulae VIII or IX shown in the Table below are used. The corresponding compounds of the formula I are obtained, which in finishes give colorations in the hues shown in the right-hand column, and with properties similar to those described in Example 1.

TABLE I

| Example | Aniline derivative (VIII) or (IX) | Hue |
|---|---|---|
| 2 | | greenish yellow |
| 3 | | greenish yellow |
| 4 | | reddish yellow |
| 5 | | greenish yellow |
| 6 | | reddish yellow |
| 7 | | greenish yellow |
| 8 | | greenish yellow |
| 9 | | greenish yellow |

TABLE I-continued

| Example | Aniline derivative (VIII) or (IX) | Hue |
|---|---|---|
| 10 | H₃C-O-, H₂N-, phthalimide structure | reddish yellow |
| 11 | H₃CO-, H₂N-, Cl-substituted phthalimide | reddish yellow |
| 12 | H₂N-C₆H₄-N(phthalimide)-CONH-C₆H₅ | greenish yellow |
| 13 | H₂N-C₆H₄-N(phthalimide)-Br | greenish yellow |
| 14 | Cl, H₂N-C₆H₄-NHCOCONH-C₆H₄-CH₃ | greenish yellow |
| 15 | H₂N-C₆H₄-NHCOCONH-C₆H₅ | greenish yellow |

EXAMPLE 16

29 parts of 1-(cyano-phenylcarbamyl-methylene)-3-iminoisoindoline and 25 parts of 4-phthalimidoaniline in 600 parts of glacial acetic acid are refluxed for 4 hours. After the mixture has cooled, it is filtered and the product is washed with glacial acetic acid and methanol, and dried. 48 parts of a reddish yellow pigment are obtained; this can be employed directly for pigmenting paints and gives very fast colorations.

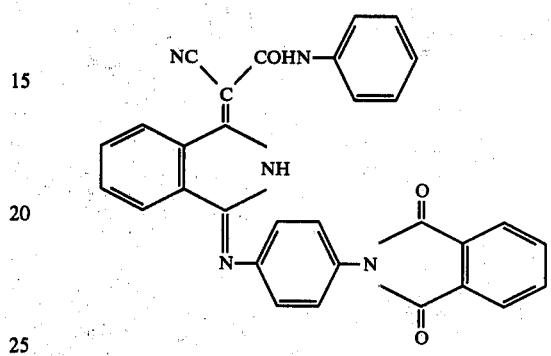

EXAMPLES 17 TO 27

The procedure described in Example 1 or 16 is followed, except that semi-condensation products of the formula VII, where R has the meaning shown in column 2 of the Table below, and the aniline derivatives (VIII) or (IX) shown in the same Table, are used; the corresponding compounds of the formula I are obtained. These color finishes in the hues shown in the right-hand column, and the colorations are very fast.

TABLE II

| Example | R | Aniline derivative (VIII) or (IX) | Hue |
|---|---|---|---|
| 17 | —CONHCH₃ | H₂N-C₆H₄-N(phthalimide) | greenish yellow |
| 18 | —CONHC₂H₅ | H₂N-C₆H₄-N(phthalimide) | greenish yellow |
| 19 | —CONH—C₆H₅ | H₂N-C₆H₄-N(naphthalimide) | reddish yellow |
| 20 | —CONH—C₆H₅ | H₃C-, H₂N-C₆H₃-N(phthalimide) | greenish yellow |
| 21 | —CONH—C₆H₄-CH₃ | H₂N-C₆H₄-N(phthalimide) | greenish yellow |

TABLE II-continued

| Example | R | Aniline derivative (VIII) or (IX) | Hue |
|---|---|---|---|
| 22 | —CONH—⟨CH₃,Cl⟩ | H₂N—⟨⟩—N(isoindoline-1,3-dione) | reddish yellow |
| 23 | —CONH—⟨CH₃,Cl⟩ | H₂N—⟨H₃C⟩—N(isoindoline-1,3-dione) | greenish yellow |
| 24 | —CONH—⟨Cl⟩ | H₂N—⟨⟩—N(isoindoline-1,3-dione) | reddish yellow |
| 25 | —CONH—⟨Cl⟩ | H₂N—⟨⟩—N(benzo-isoindoline-1,3-dione) | neutral yellow |
| 26 | —CONH—⟨Cl⟩ | H₂N—⟨H₃C⟩—N(isoindoline-1,3-dione) | greenish yellow |
| 27 | —CONH—⟨OCH₃, Cl, OCH₃⟩ | H₂N—⟨⟩—N(isoindoline-1,3-dione) | reddish yellow |

EXAMPLE 28 (USE EXAMPLE)

a. Finish 10 parts of the colorant obtained as described in Example 1 and 95 parts of a baking finish mixture which contains 70% of coconut alkyd resin (as a 60% strength solution in xylene) and 30% of melamine resin (as a solution of about 55% strength in butanol/xylene) are ground in an attrition mill. After applying the finish, and baking it for 30 minutes at 120° C., greenish yellow fullshade coatings having good lightfastness and fastness to overspraying are obtained. If titanium dioxide is added, greenish yellow white reductions are obtained.

If the colorants of Examples 2 to 27 are used, coatings in similar hues and with similar properties are obtained.

b. Plastic 0.5 part of the colorant obtained as described in Example 1 is applied to 100 parts of standard-type polystyrene granules by tumbling. The surface-colored granules are homogenized by extrusion at from 190° to 195° C. Greenish yellow extrudates are obtained; the coloration has good lightfastness.

If a mixture of 0.5 part of colorant and 1 part of titanium dioxide is used, high-hiding greenish yellow colorations are obtained.

If the colorants obtained according to Examples 2 to 27 are used, similar colorations result.

c. Printing ink 8 parts of the colorant obtained as described in Example 1, 40 parts of a rosin modified with phenol/formaldehyde and 55–65 parts of toluene are mixed thoroughly in a dispersing apparatus. A greenish yellow toluene-based gravure printing ink is obtained. The prints obtained with this ink have good lightfastness and fastness to weathering.

If the colorants of Examples 2 to 27 are used, similar results are obtained.

TABLE III

| Bands in the X-ray diffraction diagram | |
|---|---|
| Diffraction angle 2Θ (CuKα radiation) | Intensity [%] (based on the most intense line) |
| 5.2 | 21 |
| 7.8 | 4 |
| 10.2 | 8 |
| 11.7 | 100 |
| 15.4 | 19 |
| 18.2 | 40 |
| 19.2 | 6 |
| 23.3 | 10 |
| 25.5 | 11 |
| 27.0 | 7 |
| 28.0 | 5 |

I claim:

1. A sparingly soluble isoindoline colorant of the formula:

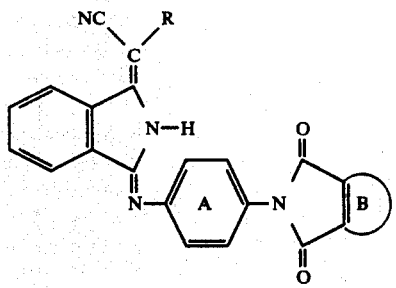

wherein
R is carbamyl, N-$C_1$-$C_4$-alkylcarbamyl or N-phenylcarbamyl;
B is a 1,2-phenylene, 1,2-naphthylene or 2,3-naphthylene; and
A, B and the phenyl radical in R independently of one another are unsubstituted or substituted by groups which do not confer solubility to the isoindoline colorant and are selected from the group consisting of halogen, $C_1$-$C_6$-alkyl, $C_1$-$C_6$ alkoxy, nitro, trifluoromethyl, carbamyl, ureido, sulfamyl, cyano, $C_1$-$C_5$ alkoxycarbonyl, $C_1$-$C_5$ alkanoyl, $C_1$-$C_5$ alkylcarbamyl, $C_1$-$C_5$ alkylureido, $C_1$-$C_5$ alkanoylamino, $C_1$-$C_6$ alkylsulfonyl, $C_1$-$C_6$ alkylsulfamyl, aryloxycarbonyl, aroyl, aroylamino, arylsulfonyl, arylcarbamyl, arylsulfamyl, aryl, arylureido and arylazo.

2. A sparingly soluble isoindoline colorant of the formula:

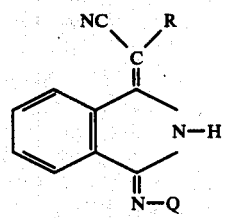 (I)

wherein
R is carbamyl, N-$C_1$-$C_4$-alkylcarbamyl or N-phenylcarbamyl and
Q is a group of the formula

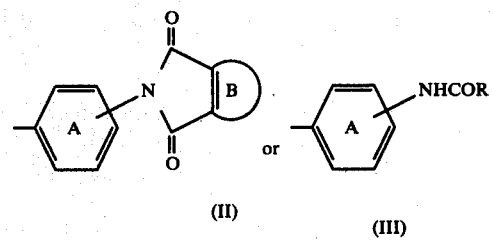

(II)  (III)

where A is 1,3- or 1,4-phenylene, ring B is 1,2-phenylene, 1,2-naphthylene or 2,3-naphthylene, and $R^1$ is CONH-$C_6H_5$ or CONH-2-methylphenyl, and wherein A, B and the phenyl radical of the phenylcarbamyl substituent of group R independently of one another are unsubstituted or substituted by groups which do not confer solubility to the isoindoline colorant and are selected from the group consisting of halogen, $C_1$-$C_6$ alkyl, $C_1$-$C_6$ alkoxy, nitro, trifluoromethyl, carbamyl, ureido, sulfamyl, cyano, $C_1$-$C_5$ alkoxycarbonyl, $C_1$-$C_5$ alkanoyl, $C_1$-$C_5$ alkylcarbamyl, $C_1$-$C_5$ alkylureido, $C_1$-$C_5$ alkanoylamino, $C_1$-$C_6$ alkylsulfonyl, $C_1$-$C_6$ alkylsulfamyl, aryloxycarbonyl, aroyl, aroylamino, arylsulfonyl, arylcarbamyl, arylsulfamyl, aryl, arylureido and arylazo.

3. The sparingly soluble isoindoline colorant as claimed in claim 1, wherein A, B and the phenyl radical in R independently of one another are unsubstituted or substituted by chlorine, bromine, $C_1$-$C_4$-alkyl or $C_1$-$C_4$-alkoxy.

4. A sparingly soluble isoindoline colorant of the formula

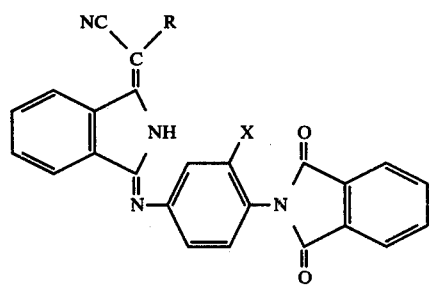

where R is carbamyl, N-$C_1$-$C_4$-alkylcarbamyl or N-phenylcarbamyl and X is hydrogen, chlorine, methyl or methoxy, and where the phenyl radical in R is unsubstituted or substituted by chlorine, bromine, $C_1$-$C_4$-alkyl or $C_1$-$C_4$-alkoxy.

5. The sparingly soluble isoindoline colorant as claimed in claim 1, wherein R is carbamyl.

6. The sparingly soluble isoindoline colorant as claimed in claim 1, wherein R is N-phenylcarbamyl which is unsubstituted or substituted in the phenyl by chlorine, bromine, $C_1$-$C_4$-alkyl or $C_1$-$C_4$-alkoxy.

7. The sparingly soluble isoindoline colorant as claimed in claim 4, wherein R is carbamyl or N-phenylcarbamyl which is unsubstituted or substituted in the phenyl by chlorine, bromine, $C_1$-$C_4$-alkyl or $C_1$-$C_4$-alkoxy.

8. The sparingly soluble isoindoline colorant as claimed in claim 4, wherein R is carbamyl.

9. An isoindoline colorant of the formula

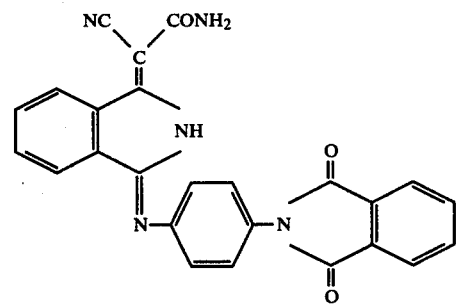

* * * * *